United States Patent
Zhang et al.

(10) Patent No.: US 8,429,614 B2
(45) Date of Patent: Apr. 23, 2013

(54) METHOD AND APPARATUS OF EFFECTIVE FUNCTIONAL TEST DATA GENERATION FOR WEB SERVICE TESTING

(75) Inventors: Liang-Jie Zhang, Cortlandt Manor, NY (US); Zhong Jie Li, Beijing (CN); Jun Zhu, Beijing (CN); Nagaraj Chinni, Bangalore (IN); Gopal Kittur, Bangalore (IN); Naomi M. Mitsumori, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 12/144,192

(22) Filed: Jun. 23, 2008

(65) Prior Publication Data
US 2009/0319832 A1    Dec. 24, 2009

(51) Int. Cl.
*G06F 11/36* (2006.01)

(52) U.S. Cl.
USPC .............................. 717/124; 714/37; 714/38.1

(58) Field of Classification Search ................... 717/124
See application file for complete search history.

(56) References Cited

U.S. PATENT DOCUMENTS 6,473,794 B1 * 10/2002 Guheen et al. ................ 709/223
2008/0250051 A1 * 10/2008 Grechanik et al. ............ 707/102

* cited by examiner

*Primary Examiner* — Lewis A Bullock, Jr.
*Assistant Examiner* — Mohammed Huda
(74) *Attorney, Agent, or Firm* — Scully, Scott, Murphy & Presser, P.C.; Daniel P. Morris, Esq.

(57) ABSTRACT

A method, system and apparatus for generating test data for web services testing load a selected file describing one or more web services operations into memory, select an operation specified in said loaded file, and identify one or more fields used in said operation. The one or more fields are customized and the customization is validated. Generation rules are configured and one or more variations of the fields are generated.

25 Claims, 6 Drawing Sheets

400

| Constraint | Description |
|---|---|
| enumeration | Defines a list of acceptable values |
| fractionDigits | Specifies the maximum number of decimal places allowed. Must be equal to or greater than zero |
| length | Specifies the exact number of characters or list items allowed. Must be equal to or greater than zero |
| maxExclusive | Specifies the upper bounds for numeric values (the value must be less than this value) |
| maxInclusive | Specifies the upper bounds for numeric values (the value must be less than or equal to this value) |
| maxLength | Specifies the maximum number of characters or list items allowed. Must be equal to or greater than zero |
| minExclusive | Specifies the lower bounds for numeric values (the value must be less than this value) |
| minInclusive | Specifies the lower bounds for numeric values (the value must be less than or equal to this value) |
| minLength | Specifies the minimum number of characters or list items allowed. Must be equal to or greater than zero |
| pattern | Defines the exact sequence of characters that are acceptable |
| totalDigits | Specifies the exact number of digits allowed. Must be greater than zero |
| whiteSpace | Specifies how white space (line feeds, tabs, spaces, and carriage returns) is handled |

FIG. 4

METHOD AND APPARATUS OF EFFECTIVE FUNCTIONAL TEST DATA GENERATION FOR WEB SERVICE TESTING

FIELD OF THE INVENTION

The present disclosure relates to service oriented architecture and more particularly to functional test data generation for web service testing.

BACKGROUND OF THE INVENTION

Web services are considered as foundational components to service oriented architecture (SOA). As more and more enterprises are deploying more and more web services, and services ecosystems grow to connect more and more parties, the importance attributed to the quality of web services is becoming incontrovertible. It is no surprise that web service testing is one of the first things that is thought of when considering SOA testing. Currently there are quite a lot of tools with web service testing capability in the market or open source community: to list a few, Parasoft SOATest, Mindreef SOAPScope, CrossCheck Networks SOAPSonar, SOAPUI.

Generally these tools provide a graphical editor that allows users to import web services definition language (WSDL) definition, edit test cases and run the test cases. A test case has an input message that will be used as a parameter to invoke the service under test, and an output message that is expected from the service. The actual output message is compared to the expected one. Based on the comparison, a judgment is made on whether or not the service function is correct.

For most of these tools, there is no automatic test message/data generation capability. A test message refers to a message that tells what parameter values to use in testing a web service operation. Users need to input the contents of the test messages manually from the user interface. This will lead to time-consuming test case design process. Consider a simple "add" function that takes two parameters x and y. To adequately test this function, many variations on the parameters need to be tried: $x=1, y=1$; $x=-1, y=1$; $x=0, y=1$; $x=-1, y=-1$; $x=a$ maximum value for the integer int type, $y=1$; $x=$non-integer value, $y=1$; etc. This is only a simple case that involves only two parameters. Usually, a real web service operation uses large messages with complex structures. Tens or hundreds of fields in a single message is common. Thus, it would take a lot of effort to build a test case design manually.

Other existing tools generate test cases automatically from the WSDL definition. SOAPSonar utilizes XSD-Mutation, a patent-pending automation technique, to generate a set of test cases, both positive and negative. The test mutations may occur at the data type, data value, message structure, or protocol binding level. An example mutation is a buffer overflow type boundary conditions for an unbounded string type field. The test cases generated by SOAPSonar are mostly random test cases and may be ineffective in detecting bugs as it only refers to the data structure and type information defined in the WSDL. In reality, a WSDL definition usually does not have much information about the "real" type and value space of a field. For example, the parameters of an add operation are all with a "string" type, which gives no clue for a test generation algorithm to search in the numeric type value space. It can only generate random strings based on this type definition. These test cases may be ineffective in detecting bugs as most of the inputs are filtered in the service implementation before real business logic begins.

Rational Tester for SOA Quality (RTSQ)™ from International Business Machines Corporation (IBM) can generate a random test message from a WSDL definition, e.g., 'abc' for each string type field. The primary usage of such test cases is for performance testing, where message values are not important. This tool cannot be applied to the functional testing of web services.

In the object-oriented world, there are tools that can automatically generate test cases from method declarations. For example, Parasoft Jtest can do Java class unit test generation—test each method with various boundary values of each input parameter (boundary values for string type: null, empty, special characters, etc.), observe whether runtime exception occurs. It is not applicable to web service test generation because 1) there is the same type problem of WSDL definition as mentioned earlier; 2) further schema-compliance is needed in Web service test data, i.e., the input message must comply to its schema definition. WSDL and Extensible Markup Language (XML) schema definition (XSD) standards allow value space restriction on specific types, which can be used for validation of the XML. For example, for integer (int) type, max and min value can be specified; for string type, max and min length can be specified. Such information cannot be defined in Java method declaration, thus not considered in any test generation method.

BRIEF SUMMARY OF THE INVENTION

A method and system for generating test data for web services testing are provided. The method in one aspect may comprise loading a selected file describing one or more web services operations into memory and identifying an operation specified in said loaded file. The method may also comprise identifying one or more fields used in said operation and receiving user customization of said one or more fields. The method may further comprise validating said user customization of said one or more fields, configuring one or more generation rules, and generating one or more variations of said one or more fields.

A system for generating test data for web services testing, in one aspect, may comprise a processor, a parser module operable to parse one or more files describing one or more web services operation, and a graphical user interface module executable on the processor and operable to interact with a user and present said parsed data. A configuration validation module is operable to validate user customizations and generation rule selections, and a variation generator module is operable to produce data variations for the selected to-test fields.

A program storage device readable by a machine, tangibly embodying a program of instructions executable by the machine to perform above method may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 shows examples of the type constraint supported by XSD.

DETAILED DESCRIPTION

A method and system are provided for web service test data generation, for example, that can generate effective test data for the purpose of web service functional testing. Both the information contained in the WSDL/XSD files and the information provided by testers are leveraged. Briefly, the Web Services Description Language (WSDL) is an XML-based language used to describe Web services, e.g., the services a business offers, and to provide a mechanism for individuals and other businesses to access those services electronically. XSD may be used to formally describe the elements in an Extensible Markup Language (XML) document. These two kinds of information are cross-checked for validity. Users may customize tested fields, field constraints and data generation rules. Effective test data is generated that have higher probability to penetrate the service implementation logic.

Figure 1:
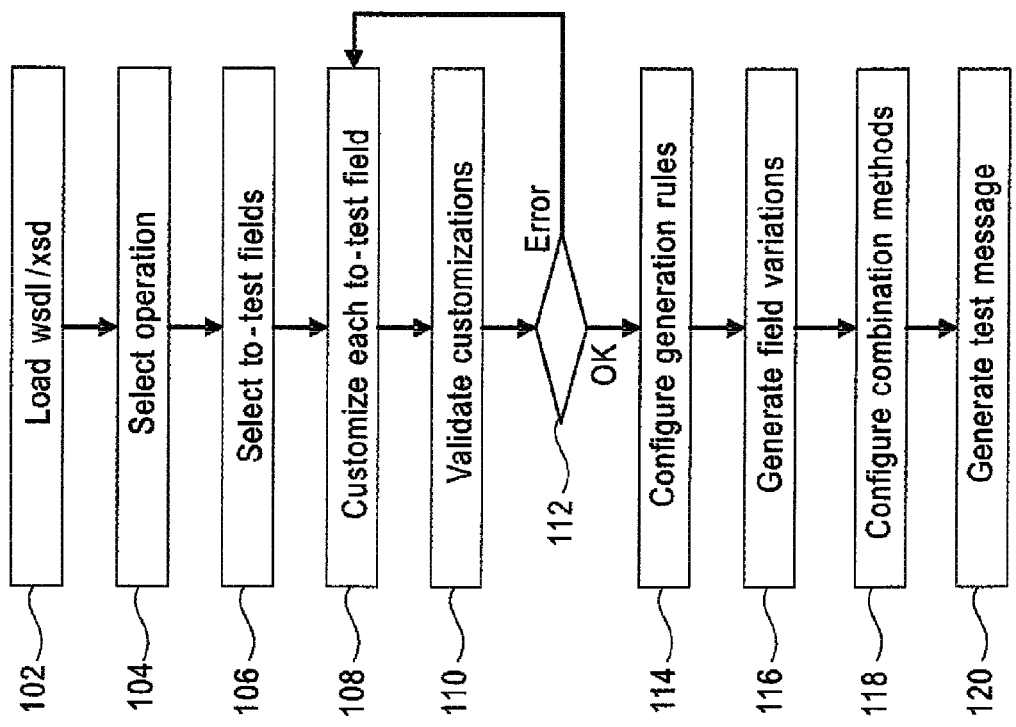
FIG. 1 illustrates a method for generating web service test data in one embodiment.

FIG. 1 illustrates a method for generating web service test data in one embodiment. At 102, the WSDL/XSD files are loaded. All the contained operations are presented to the user. For example, WSDL file for the Google™ search web service contains three operations: doGetCachedPage, doSpellingSuggestion and doGoogleSearch. The relationship between a web service and the contained operations is similar to that of between a class and its member methods in object-oriented programming. At 104, the user then selects an operation for which he wants to generate test data. In another embodiment, one or more operations may be automatically identified and presented to the user to select. Yet in another embodiment, an operation may be automatically selected and presented to the user on the user interface. The input message structure (i.e., the contained data fields and their types) defined for this operation is presented to the user via the user interface. It can contain many fields of various types (as supported by the XSD specification), organized in a tree structure. At 106, the user selects a set of fields that he wants to include into this round of test data generation. He can choose all the fields, or only some of them, based on web service requirements and his own knowledge or consideration of what are important and what are not. One or more fields may be also automatically or semi-automatically selected using code analysis technique to calculate which fields really matter for correct business processing. For example, the system and method in one embodiment of the present disclosure may analyze the web service implementation code, build the data flow, identify how a parameter field is used in the data flow, for instance, whether it is used in a condition, an assignment, an invocation to another method or a database operation. These are some examples of usages where programming mistakes can be made and thus deserve testing.

Figure 2:
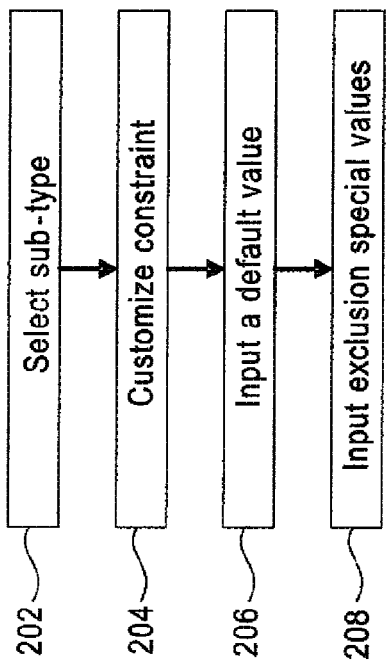
FIG. 2 illustrates a method flow for customizing one or more selected to-test fields.

At 108, the user may browse through these selected fields and make customization to a field if necessary or desired. FIG. 2 illustrates a method flow for customizing one or more selected to-test fields. In performing the customization, the user can specify a sub-type at 202, which is a further restriction on the base type that is defined in the original WSDL/XSD files. For example, subtypes of "string" can be any XML simple types excluding "string" itself: "int", "float", "boolean", etc. A subtype of "int" can be "short", "byte" or "enumeration". The user can add a constraint or modify the original constraint to make it more realistic in reflecting its actual semantics at 204. For example, for a subtype of "enumeration", a constraint can be {1, 2, 3}. For an original constraint of L(1-5)—length should be between one and five, a modification can be L(5)—length should be five.

At 206, the user inputs a default value, which will be used as the baseline for data variations. Default values may also be obtained automatically from real web service call trace. Real web service call trace is a record of the web service calls with specific input and output messages in real execution environment. It can be obtained using a monitoring tool like the data collector for IBM web service navigator. Default data may also be obtained by reusing early web service build time test data that are used in unit testing phase, when classes of the web service implementation code are tested individually.

At 208, the user can input exclusion special values to indicate that these values are not "special" for this specific field. For example, @ is not a special value for an email field. Without this exclusion, @ may be treated as a special character for an email field and get special testing attention. Special character testing is a common test method that is aimed to detect programming errors related to special character processing: the code is correct in handling a string with "normal" characters like "abc" (alphabetic string), but fails to handle a string with special characters like ~,!,@,#.

Referring back to FIG. 1, after the user finishes the customization of the to-test fields, the final state or the customization can be validated in terms of its completeness and correctness as shown at 110. A possible error that can be identified during validation may be that a selected field is not provided with a default value, or a required field is de-selected. If an error occurs at 112, the user may fix the error by repeating the customization step at 108. Otherwise, the user can configure generation rules at 114. The system and method of the present disclosure may provide a list of pre-defined rules, for example, via the user interface, from which the user can select; there can also be a language/schema, using which the user can define new rules. An example of a rule may be: for int type, generate two negative variations based on the default value, one smaller than the lower bound, the other greater than the upper bound. Based on the configured rules, test data can be generated automatically at step 116. For each selected field, there may be multiple variations generated. At step 118, variations of different fields can be combined in different ways to form a complete input message. The combination method may depend on the test strategy. One possible test strategy is to test each field one by one using different variations of this field and at the same time keeping the other fields to their default values. With this strategy, it is easier to reveal the responsible field when an error occurs during testing. At step 120, the complete input message can then be used to actually test the web service implementation as the input message of a related operation of the web service. An input message refers to an operation message specifying the operation and fields and field values being tested. For this purpose, various tools can be used.

The method and system of the present disclosure allow the user to provide or enter a subtype and customize field constraint. With such customization options, the user can influence the test generation and generate data variations that are more focused in the right value space. Take the "Add" web service as an example, the user can specify an "int" subtype based on the "string" type for the parameters that are being added. Then the test generation may focus on "int" value variations. These variations have better chance to penetrate the real business logic of the service implementation. Random "string" values may be filtered at the entrance of the implementation. It should be noted that the test generation can generate nonnumeric "string" values.

The method and system also may be used to generate a smaller size of test data variations. By allowing the user to select to-test fields, select sub-type, and modify constraint, the variations will be more focused. Irrelevant fields of a message can be effectively filtered. Reduced test data size will reduce test execution time. This say, a rational set of regression test cases can be kept.

The generation rules can be configured or added by users to bring in more intelligence and best practices in automatic test generation. For example, rules can be added such as: generate data variations that are consistent with the "language" field. For instance, if the "language" is Chinese, the "date" field will use the format year/month/day; if the "language" is English, the "date" field will use the format month/day/year; etc.

Different combination methods can be used to further improve the test coverage. For example, if two fields are related to each other, combination of their different variations may improve the test coverage. For instance, in an online gift purchasing service, discount will be made based on client type and price. If the client type is gold or the price is over 10K, the discount will be 85%; otherwise the discount is 95%. To test this business rule, suppose there are two variations for the client type field: {gold, silver}, and two variations for the price field {9999, 10001}. A pair-wise combination has four results: {gold, 9999}, {gold, 10001},{silver, 9999}, {silver, 10001}. The system and method of the present disclosure in one embodiment may automatically and intelligently identify related fields and produce combinations of different variations.

The disclosed method and system can generate test data that are effective in detecting bugs and efficient in reducing test time. FIG. 1 and FIG. 2 illustrate an example flow of a method in one embodiment for generating test data. The execution sequence of the flow shown therein may be adjusted or vary depending on different conditions. For example, users can select composition method even before selecting generation rules. In addition, some steps may be performed optionally. For example, "select to-test field" step may be performed optionally. If users decide to test all the fields, or all the fields are required fields, for example, that step may be skipped. The system or tool implementing the method may automatically select all the fields in such instances. Certain fields, for example, required fields, may be also automatically selected by the tool or the system of the present disclosure in one embodiment.

Figure 3:
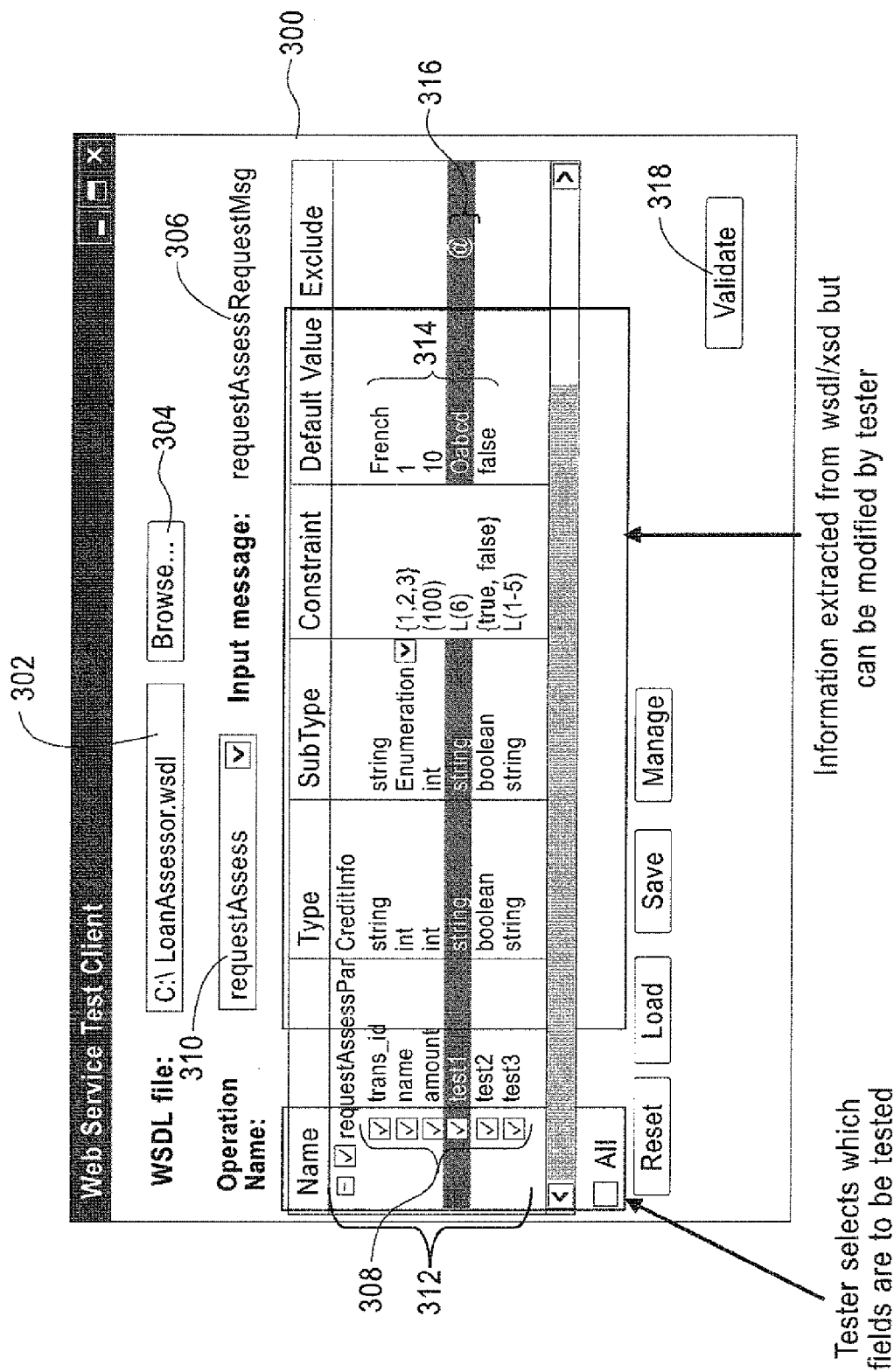
FIG. 3 shows a graphical user interface (GUI) screenshot of an example implementation of the method in one embodiment of the present disclosure.

FIG. 3 shows a graphical user interface (GUI) screenshot of an example implementation of the described method in one embodiment. Using the input from the user, WSDL files of the web service to be tested are loaded into memory. As shown at 302, a user may manually key in the file name or use the browse button 304 to select a file from different folders on the system, network storage, etc. Any other methodology may be employed to determine the WSDL to load. In one aspect, when the user selects or enters a WSDL file, the associated XSD files will be automatically loaded. FIG. 3 shows a web service and one operation named "requestAssess," 310 whose input message has a type "requestAssessRequestMsg" 306. All these information and other information may be obtained from the WSDL and the associated XSD files. In one embodiment, the service's structure is displayed as a tree 312. For example, the following information can be taken from the WSDL/XSD files: fields, field name, type, subType, constraint. If there is no restriction defined on a basic type (e.g., an enumeration), as can be determined from the XSD file content, the subType may be the same as type. An example of a restriction or constraint that can be defined in XSD by the XSD designer is the "amount" field with a constraint of (100). XSD can also specify the occurrence constraint of a field through minOccur and maxOccur attributes, and such occurrence constraints can be determined from the XSD file content. In this example, the field trans_id is a required field as the minOccur attribute of this field has a value of 1, meaning that the minimum occurrence of this field is 1. In this example, trans_id field must be filled in the input message. A person having an ordinary skill in the web service area of technology should understand these formats of WSDL and XSD. Further description may be found in WSDL 1.2. http://www.w3.org/TR/2003/WD-wsdl12-20030303/; XML Schema Part 0: Primer, http://www.w3.org/TR/2000/WD-xmlschema-0-20000407/.

Via the user interface 300, users may select an operation to test. One web service can define multiple operations. In one embodiment, users select one operation at one time to generate test data for the selected operation. The example shows an operation 310 by default once the WSDL file is loaded. One or more operations may be automatically shown as pull down menu items from which the user may select.

The user may also select to-test fields 308 (also referred to as test fields). In one embodiment, the required fields as specified in the WSDL/XSD files can be selected automatically. For other fields that are not required (minOccur=0, meaning that the minimum occurrence of this field is zero), the user may select one or more of those fields if the user wants to include them in the test message. The selection criteria can vary: e.g., fields that matter for business process decisions (conditions, i.e., Boolean expressions like x+y>100, and assignments, i.e., data calculations like x:=y) in the web service implementation, fields that will be saved into databases, etc. Such fields can be automatically or semi-automatically selected using code analysis as described above.

The user may also customize each to-test field. For instance, the user may select a sub-type. Many WSDL/XSD definitions specify a "string" type for most fields, although XSD has a lot of predefined types: string, boolean, date, dateTime, time, integer, long, int, short, byte, decimal, float, double, etc. There can be multiple reasons for such a practice. One reason is that this allows easier web service implementation changes. A string type can safely hold value of various types. The web service implementation will use some filtering logic to guard against invalid values. The drawback is that the web service provider must bear the burden of data validation in the business logic. This is also not helpful to testers and automatic test generation tools as test data variations can only be made based on the "string" type. If one knows for certain a field is of "int" type, Max value, Min value can be tested. For example, it should be tested that a LoanAssessor web service 302 will respond with the right message if the loan request amount exceeds a required value in the specification.

The use may further customize one or more constraints associated with the fields or variables. FIG. 4 shows examples of the type constraint supported by XSD. If specified in the original WSDL/XSD files, those constraints can be used directly in test data generation. Users can also make modification if the modification is compatible with the original constraints. If not specified in the original definitions, users can input their constraints based on the later-provided sub-type using the constraints listed in FIG. 4. For example, the length constraint specifies the exact number of characters or list items allowed. A field of "string" type can define a length 5 constraint. Other constraints such as those listed in FIG. 4 may be specified similarly.

The user may also input a default value. Default value sets the base line of variations in one embodiment. Each selected to-test field has a default value. The default values can also be filled in automatically by referring to existing real test message in an XML file or other sources. An input message (containing the input parameters for each web service operation) composed of the selected fields with default values is a base line test message. Typically this is the message used in a basic positive test case. With this basic positive test case, testers can check that the service functions correctly under a normal input and responds with a correct output message.

Default values may be designated by users. Use of default values allow users to design different test scenarios that can be easily told apart from each other by the difference of message field values. For example, users can use two different values of the trans_id field—"normal request" and "high amount request"—to represent two different test scenarios. Default values act as a mechanism of correlating different operations that have some kind of dependency relationship. For example, to test a findBook operation, a book must exist in the book library. The book can be added into the library with an addBook operation call, and the book title, ISDN, or author information used in findBook operation should be the same as that used in the addBook operation. Such dependency relationship may not be easy to recognize automatically, so it may be ensured by users through default values. Users may type in the default values for each field at 314.

The user may also input exclusion special values. Inserting special characters is a common strategy to generate variations. For example, for a "string" type field, special characters like ~!@# can be used together with alphabetic characters as variations. However, whether or not a character is "special" depends on the field semantics. For example, @ is normal in an email address. Such exclusions may be indicated before test generation. If a character is in the exclusion list of a field, it will not be used (as special characters) together with alphabetic characters (as normal characters) to form variations for this field. Users may type in the exclusion values for each field 316.

In one embodiment of the present disclosure, the customizations can be validated automatically. The user customizations may be validated against the original constraints in the WSDL/XSD definition so that user introduced error could be detected and avoided. Here are two example validation items: a) each selected field must have a default value, b) each modification of constraint must be valid for the original one. If there are errors, users are alerted to fix them and run validation again. The validation function can be invoked via an action button 318.

Figure 6:
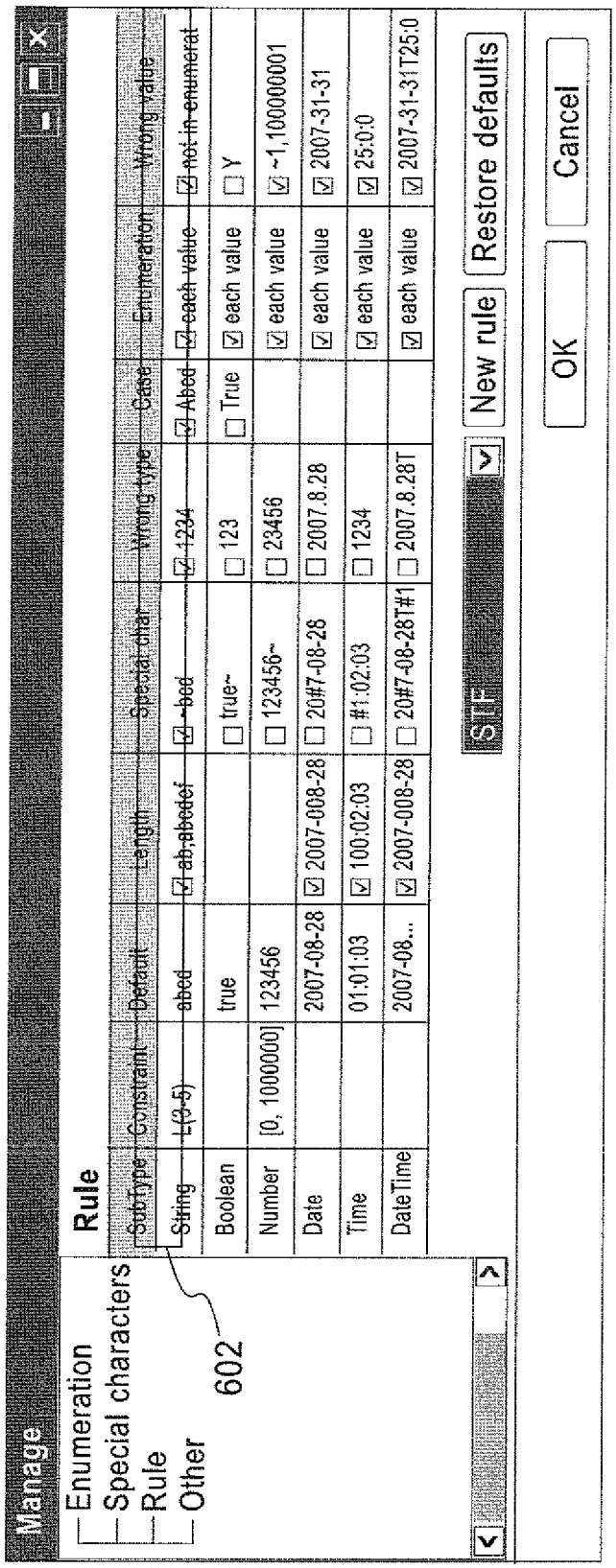
FIG. 6 illustrates an example generation rule.

The user may also configure generation rules. FIG. 6 shows an example GUI that can be used for the user to perform the configuration. The column headers tell what each column is used for. Generation rules can be different for different data types, so they are organized by data types—each row specifies types of variation generation rules for a specific data type: String, Boolean, Number, Date, Time, DateTime, etc., as listed in the first column of this table. The first column is "SubType" instead of "Type", because the "SubType" represents the actual data type of a field, for example, provided by the user in "Customize each to-test field" 108. The second column is "Constraint" of the "SubType". The third column is an example "Default" value. Each of the other columns represents a category of variation generation method. In each category, related variation generation rules are listed. The first row of the generation rule table in FIG. 6 (602) illustrates an example generation rule for the "String" subtype. It lists example values for different categories or attributes associated with the "String" subtype. Each value represents a generation rule. The default value is "abcd". The "Length" category includes a variation with a length smaller than the minLength, and another variation with a length over the maxLength. MinLength and maxLength are the allowed minimum and maximum string length of this variable, respectively, as defined in the constraint or pattern of this variable in the respective WSDL or XSD file. In this case, the constraint is L(3-5), meaning that the minimum string length is 3 and the maximum is 5. So one variation value is "ab", the other is "abcdef". Note that the Constraint "L(3-5)" and Default value "abcd" are not tied to any particular field of the test message. They are used only to illustrate the variation generation rules to users by examples. A particular field may have a default value "xyzw" and variations "xyz" and "xyzwuv".

The "Special char" category includes all the variations derived by replacing an original letter with a special character. The example variation shows one that replaces the character 'a' in the default value "abcd" with another character '~', resulting in a value "~bcd". The "Wrong type" category includes all the variations that have a different type: integer, float, etc. The "Case" category includes case variations: changes between lower case and upper case. The "Enumeration" category includes all the enumeration values that are provided in the subType. The "Wrong value" category includes all the variations with the correct type but incorrect value. If an enumeration subtype is defined, a value not in the enumeration value set is invalid.

The example rule representation shown in FIG. 6 provides easy-understanding, compared with a rule specification language that uses logical expressions like stringLength(variable)<3 to specify a rule. FIG. 6 shows only an exemplary rule representation and there can be other representation methods. The table shown may be provided by the method and system of the present disclosure in one embodiment and user may further configure it, for example, select or deselect a rule for instance, based on specific needs.

In addition to the examples listed in FIG. 6 there may be other rules for the "String" data type. There can be rules for other data types. There can be rules for associating different fields together, rules for calculating one field from some other fields. Users are provided with the flexibility to select among predefined rules to apply to the user's specific test purpose. In one embodiment, a checkbox may be provided next to each rule under each category. Selecting the checkbox will select the rule, and unselecting the checkbox will unselect the rule. If the rule is selected, the variations associated with the rule will be generated; otherwise they will not be generated.

Figure 7:
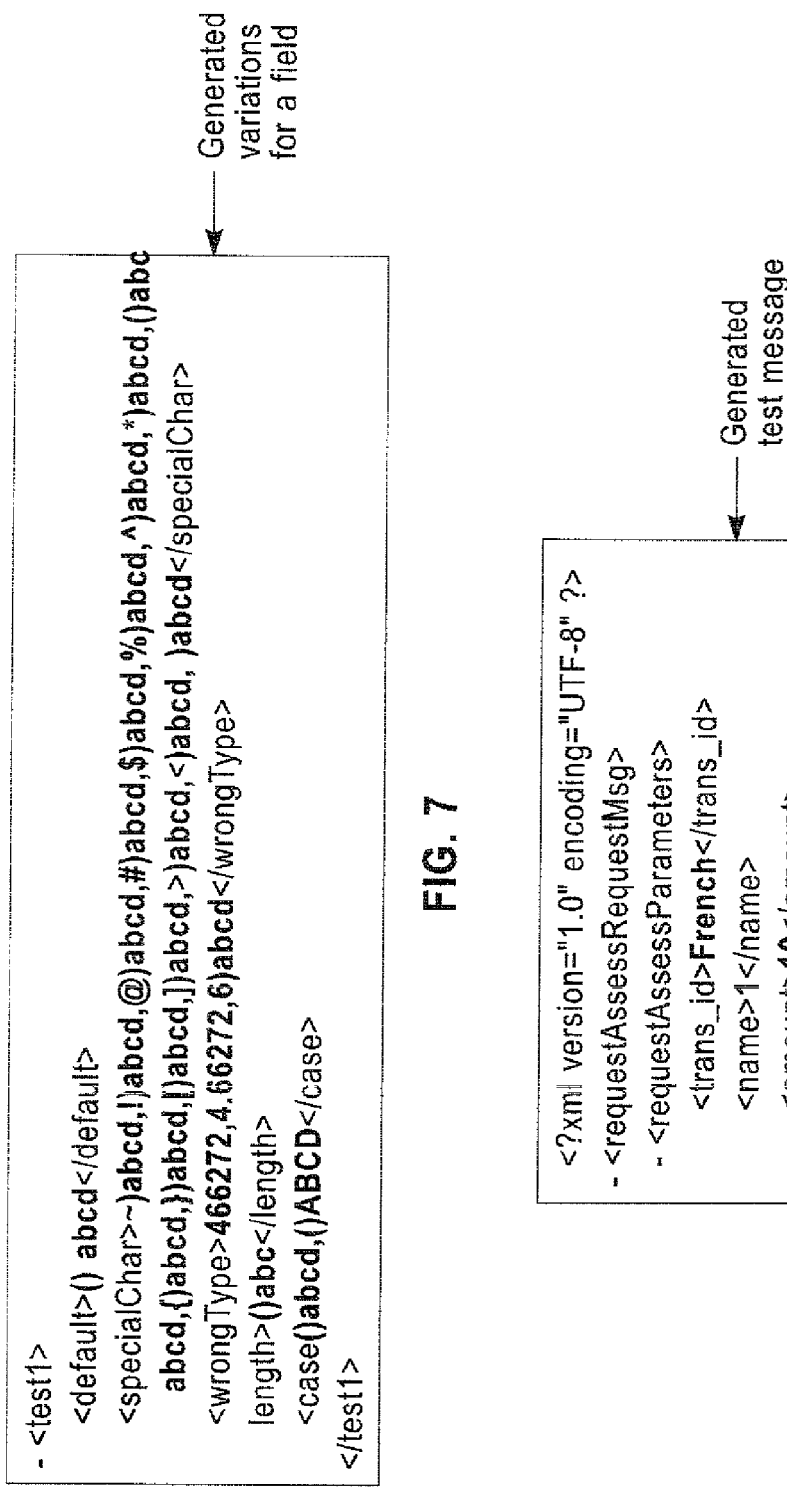
FIG. 7 shows an XML segment having the generated variations.

Based on the user customizations and generation rules, field variations can be generated. For example, "test1" is a field of string type whose constraint is "L(6)", default value is "( )abcd". The constraint may come from either the WSDL/XSD files, or from the user input at FIG. 3. The default value is from the user input at 314. FIG. 7 shows an XML segment having the generated variations.

Combination methods may be configured. For each selected field, there will be multiple variations generated. Variations of different fields can be combined in different ways to form a complete input message. Take two fields, test1 (string type) and test2 (boolean type), of the requestAssessRequestMsg message shown in FIG. 3 as an example. Variations of test1 are shown in FIG. 7. Suppose test2 has two variations: true and false. A complete input message is composed of test1, test2 and other fields. Its test1 field will take a value from the test1 variations, and test2 field will take a value from the test2 variations. An example combination is {test1=( )abcd, test2=true}, another example is {test1=( )abcd, test2=false}. Generally, each value from test1 variations can be selected to appear together with each value from test2 variations. The combination method may depend on the test strategy. One possible test strategy is to test each field one by one using different variations of this field and at the same time keeping the other fields to their default values (method 1, as will be referenced later). With this strategy, it is easier to reveal the responsible field when an error occurs during testing. Other combination methods can be used. For example, another method (method 2, as will be referenced later) is exhaustive combination of variations of two fields to achieve a so-called pair-wise coverage. More description of pair-wise coverage may be found in (http://binstock.blogspot.com/2007/04/effectiveness-of-pair-wise-tests.html). This kind of coverage is especially useful for inter-dependent fields. For example, customerType and amount can jointly determine the discount rate. Therefore, it may be preferred that some variations for customerType {gold, silver, bronze} should be combined with some variations for amount {1000, 10000, 100000}.

Figure 8:
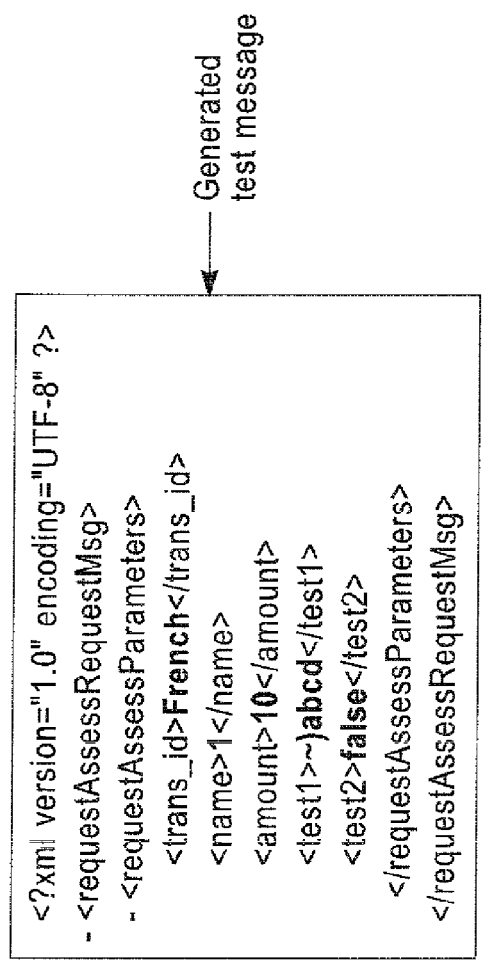
FIG. 8 is an XML segment showing a complete message example under the first kind of combination method.

The following describes generating test messages. Once the combination method is determined, the full messages can be generated. The number of messages generated depends on the combination method being used. For example, method 2 above will generate more messages than method 1 above. The complete messages can then be used to test the web service implementation. For this purpose, various tools can be used. Rational Tester for SOA Quality (http://www-306.ibm.com/software/awdtools/tester/soa/) is an example of such tool. FIG. 8 is an XML segment showing a complete message example under the combination method 1 described above. The "test1" field has a special character variation, the other fields are filled default values. The step that generates test message is optional since other test tools may be used to generate the test message given the field variations. The known test tools may have their own combination methods and thus only require field variations. Those tools may provide a user interface for selecting a combination method. These tools can compose messages. One example tool is WHITCH (http://www.alphaworks.ibm.com/tech/whitch).

Figure 5:
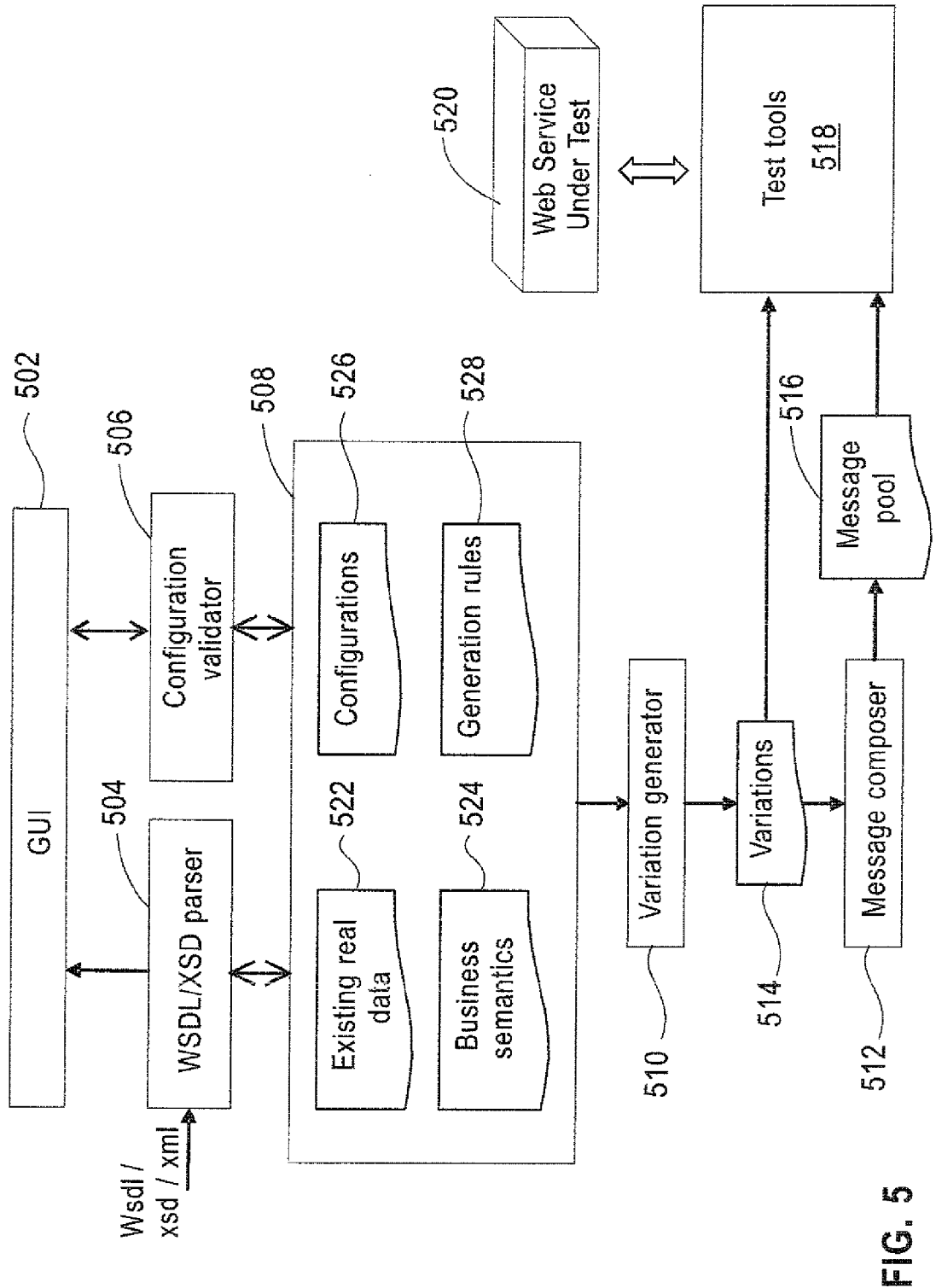
FIG. 5 is an architecture illustrating functional components that can be used to implement the method of the present disclosure in one embodiment.

FIG. 5 is an architecture diagram illustrating functional components that can be used to implement the method of the present disclosure in one embodiment. A GUI 502 enables user interaction. FIG. 3 is an example GUI. Using the GUI 502, users read the message structure, make customizations, configure generation rules, and perform other activities related to test data generation. WSDL/XSD parser 504 parses WSDL/XSD/XML files. The parsed result may be in the form of a tree data structure, and is used by GUI component to present the data to users. Existing XML files holding real web service messages may be also parsed and put into the "Existing real data" pool 522 for later use, for example, to obtain default values in test data generation. Existing XML files can be obtained from previous test logs (e.g., those generated in IBM Rational Tester for SOA Quality), or production traces (e.g., those generated in data collector for IBM web service navigator). "Business semantics" 524 contains semantic information related with the web service definition. The business semantics can be prepared manually or obtained from a tool that supports business semantic edit (e.g., IBM WebSphere Integration Developer, http://www.ibm.com/software/integration/wid/). Some of the additional field constraints can be extracted from such information.

Configuration validator 506 validates user customizations and generation rule selections Possible errors are alerted to the user. The final correct result (configurations 526, generation rules 528) is saved. Variation generator 510 takes the above artifacts as inputs, and produces data variations for each selected to-test fields. Based on the variations and the chosen combination method, message composer 512 composes the complete input messages, which are then put into a message pool 516 for the usage of test tools. The generated variations 514 and/or completed input messages 516 may be provided to test tools such as IBM Rational Tester for SOA Quality. The test tools 518 use the generated variations 514 and/or completed input messages 516 to test the one or more web services 520.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of generating test data for web services testing, comprising:

loading a selected web service definition file describing one or more web services operations and associated schema file into memory;

identifying an operation contained in said loaded file;

identifying one or more fields used as one or more input parameters in said operation;

receiving user customization of said one or more fields;

validating automatically said user customization of said one or more fields against one or more original constraints specified in the selected file or the associated schema file or combinations thereof;

configuring one or more generation rules, wherein the generation rules specify a test strategy for testing said one or more web services; and generating one or more variations of said one or more field based on the configured one or more generation rules.

2. The method of claim 1, wherein said selected file describing one or more web services operations includes web services definition language file and associated extensible markup language scheme description file, and wherein the identifying an operation contained in said loaded file includes identifying a plurality of operations contained in said loaded file, presenting said plurality of operations to a user and allowing said user to select an operation from said plurality of operations for generating test data.

3. The method of claim 1, wherein said step of identifying one or more fields includes identifying one or more required fields automatically from said selected file describing one or more web services operations.

4. The method of claim 3, further including:
allowing a user to optionally select one or more additional fields used in said operation.

5. The method of claim 1, further including configuring combining instructions to combine fields used in said operation.

6. The method of claim 1, further including generating a test message using said customized one or more fields, said one or more generation rules, and said one or more variations of said one or more fields.

7. The method of claim 1, wherein said step of receiving user customization includes allowing a user to define a default value for each of said one or more fields.

8. The method of claim 7, wherein said step of receiving user customization further includes:
allowing a user to select a subtype of a type associated with each of said one or more fields;
allowing a user to define one or more constraint values associated with each of said one or more fields;
allowing a user to define one or more exclusion special values associated with each of said one or more fields; or combinations thereof.

9. The method of claim 7, further including:
using a web service call trace to define said default value.

10. The method of claim 7, further including:
reusing previous web service test data to define said default value.

11. The method of claim 1, further including:
allowing a user to customize said one or more generation rules.

12. The method of claim 1, wherein said step of identifying one or more fields includes receiving user selected one or more fields.

13. The method of claim 1, wherein said step of identifying one or more fields includes performing a data flow analysis of a web service implementation to determine one or more fields that affect a business functionality being tested.

14. The method of claim 1, further including:
providing a graphical user interface for interacting with a user.

15. The method of claim 1, wherein said step of configuring one or more generation rules includes:
allowing a user to add one or more generation rules.

16. The method of claim 1, further including:
automatically identifying one or more related fields from said one or more fields; and
producing one or more combinations of different variations of values for said one or more related fields.

17. A system for generating test data for web services testing, comprising:
a processor;
a parser module operable to parse one or more web service definition files describing one or more web services and associated schema file, and one or more operations contained therein;
a graphical user interface module executable on the processor and operable to interact with a user and present said parsed data, including one or more fields used as one or more input parameters to said one or more operations;
a configuration validation module operable to automatically validate user customizations against one or more original constraints specified in the web service definition file or the associated schema file or combinations thereof, and validate generation rule selections, wherein the generation rule selections determine a test strategy and one or more rules are generated for testing said one or more web services based on the test strategy; and
a variation generator module operable to produce data variations for the selected to-test fields based on the validated generation rule selections.

18. The system of claim 17, further including:
a message composer module operable to combine one or more to-test fields.

19. The system of claim 18, wherein the parser module is further operable to obtain one or more fields associated with said one or more web services operation and obtain default values associated with said one or more fields.

20. The system of claim 19, wherein the parser module obtains said default values from previous test data, existing files, or combinations thereof.

21. The system of claim 19, wherein the graphical user interface enables a user to select a web services operation for said one or more web services operations.

22. The system of claim 19, wherein the graphical user interface enables a user to select one or more fields used in the selected web services operation for testing.

23. A program storage device readable by a machine, tangibly embodying a program of instructions executable by the machine to perform a method of generating test data for web services testing, comprising:
loading a selected web service definition file describing one or more web services operations and associated schema file into memory;
identifying an operation contained in said loaded file;
identifying one or more fields used as one or more input parameters in said operation;
receiving user customization of said one or more fields;
validating automatically said user customization of said one or more fields against one or more original constraints specified in the selected file or the associated schema file or combinations thereof;
configuring one or more generation rules, wherein the generation rules specify a test strategy for testing said one or more web services; and
generating one or more variations of said one or more field based on the configured one or more generation rules.

24. The program storage device of claim 23, wherein said selected file describing one or more web services operations includes web services definition language file and associated extensible markup language scheme description file, and wherein the identifying an operation contained in said loaded file includes identifying a plurality of operations contained in said loaded file, presenting said plurality of operations to a user and allowing said user to select an operation from said plurality of operations for generating test data.

25. The program storage device of claim 23, wherein said step of identifying one or more fields includes identifying one or more required fields automatically from said selected file describing one or more web services operations.

\* \* \* \* \*